US00RE42030E

(19) United States
(12) Reissued Patent
Campbell

(10) Patent Number: US RE42,030 E
(45) Date of Reissued Patent: Jan. 18, 2011

(54) CRITICAL VELOCITY REDUCTION IN A GAS WELL

(75) Inventor: Thomas Scott Campbell, Katy, TX (US)

(73) Assignee: Weatherford/Lamb, Inc., Houston, TX (US)

(21) Appl. No.: 12/492,526

(22) Filed: Jun. 26, 2009

Related U.S. Patent Documents

Reissue of:
(64) Patent No.: 7,409,998
Issued: Aug. 12, 2008
Appl. No.: 11/330,361
Filed: Jan. 10, 2006

(51) Int. Cl.
*E21B 43/12* (2006.01)

(52) U.S. Cl. ..... 166/370; 166/242.1; 166/243
(58) Field of Classification Search ..... 166/242.1, 166/242.8, 243, 332.5, 370
See application file for complete search history.

(56) References Cited

U.S. PATENT DOCUMENTS

| | | | |
|---|---|---|---|
| 2,425,202 | A | 8/1947 | Ozinga |
| 3,901,318 | A | 8/1975 | Fortenberry |
| 4,427,070 | A | 1/1984 | O'Brien |
| 6,491,107 | B2 | 12/2002 | Dearing et al. |
| 6,585,050 | B1 | 7/2003 | Etzkorn |
| 2003/0047316 | A1 | 3/2003 | Bosley |

OTHER PUBLICATIONS

Campbell, Scott; Weatherford quotation entitled "Weatherford Critical Velocity Reducing System (WCVR)"; Jul. 7, 2005.

*Primary Examiner*—Hoang Dang
(74) *Attorney, Agent, or Firm*—Wong, Cabello, Lutsch, Rutherford & Brucculeri LLP

(57) ABSTRACT

Disclosed herein is a system for enhancing the recovery of gas in a perforated interval of a gas well. The system features a tubing string having a dead string attached for reducing the flow area of the annulus in the perforated interval, thereby reducing the critical velocity of the gas, i.e., the velocity required to overcome backpressure due to fluids in the well column. The system includes a ported member for receiving gas from the annulus into the tubing string. The ported member and the dead string are isolated from each other by a retrievable plug. The disclosed system provides access from the surface through the dead string for diagnostic or corrective operations. The system also provides delivery of reagents such as foamers to the perforated region to further reduce the critical velocity.

44 Claims, 4 Drawing Sheets

CRITICAL VELOCITY REDUCTION IN A GAS WELL

Matter enclosed in heavy brackets [ ] appears in the original patent but forms no part of this reissue specification; matter printed in italics indicates the additions made by reissue.

FIELD OF THE INVENTION

The invention relates to the recovery of natural gas from natural gas wells and more particularly concerns an apparatus for reducing the critical velocity required to unload extended perforated intervals in liquid-loaded gas wells.

BACKGROUND OF THE INVENTION

FIG. 1 illustrates a production tubing string 13 deployed in a cased natural gas wellbore 101 having an extended perforated interval 102. The production rate of a natural gas well is a function of the pressure differential between the underground reservoir and the well head. This differential is decreased by back pressure against the reservoir pressure. As natural gas and associated liquids are extracted during production, a gradual loss of reservoir pressure occurs in some natural gas wells, thus decreasing the pressure differential. Natural gas wells produce liquids such as water and hydrocarbon. Removal of these produced liquids depends on the velocity of the gas stream produced from the formation. As reservoir pressure and flow potential decrease, there is a corresponding drop in the flow velocity of the natural gas through the production tubing to the well head. Eventually, when the flow velocity becomes insufficient to overcome the "fall back" velocity of the liquids, a column of liquids accumulates in the well bore. This phenomenon referred to as liquid loading decreases the production of the well because the weight of the fluid column above the producing formation causes additional back pressure, which the reservoir must overcome. The critical velocity is the flow velocity or flow rate(mcf/d) required to overcome this pressure differential needed to lift produced fluids to surface.

FIG. 2 illustrates one of the methods that have been used in the art to overcome the problem of liquid loading. Production tubing 13 is extended to include a ported tubing section 17 and a "dead string" 14. Ported tubing section 17 can be a length of production tubing, for example one joint of production tubing or a smaller length of tubing i.e., a pup joint, having holes 18 drilled therein. The inner diameter (ID) of production tubing section 13 and the ID of dead string 14 are isolated from each other by plug 15. Alternatively, this design can include a "bull plug" on the bottom of dead string 14 to force the flow up to the ported section 17. Thus, fluids do not flow through the ID of dead string 14. Rather, the function of dead string 14 is to decrease the area of the annular space 106 between the dead string and the face of the wellbore (or casing). During operation, gas and formation fluids 11 in perforated interval 102 flow in the annular region 106 around dead string 14. Dead string 14 typically has a larger outer diameter (OD) than production tubing section 13, though the dead string 14 can also be the same size as the production tubing 13. For example, in a well with 4½" casing having an ID of 4", the production string might have an OD of 2⅜" and the dead string might have an OD of 2⅞". Dead string 14 reduces the flow area in the perforated interval, thereby decreasing the required flow rates (critical velocities) to lift produced liquid in the wellbore to surface and reduce the effects of liquid loading. Formation fluids and gas 11 cross over into the production tubing section 13 via holes 18 in ported tubing section 17.

Perforated regions of a gas well often produce sand, which can stick to the tubing (i.e., to dead string 14 inside the casing), fill the tubing, or fill the wellbore below the dead string 14. Several actions that well operators would typically perform to diagnose and correct these sand problems are not possible with the apparatus illustrated in FIG. 2. and other dead string installations or designs known in the art. For example, plug 15 isolating the dead string from the production string (or a permanent "bull plug" on the bottom of dead string 14, as mentioned above) prevents an operator from accessing the wellbore below the apparatus. Thus the operator lacks the ability to run a wireline to the bottom of the wellbore to check for sand fill levels below the dead string 14. Also, when a tubing string becomes stuck in sand or when the bottom of tubing string becomes filled with sand, i.e., "sanded in," an operator typically tries to establish fluid flow to the bottom of the tubing string and back up through the annular region to disengage the string from the sand. This operation is not possible with the configuration illustrated in FIG. 2 because the holes in 17 can not be isolated and the bull plug would prevents the ability to get circulation fluids to the bottom of the production tubing.

Another deficiency in the configuration illustrated in FIG. 2 is that perforated tubing section 17 limits an operator's ability run fluid down the annular region between the tubing and the casing to the bottom of the wellbore because such fluids would tend to cross over into the ID of the tubing via holes 18. Thus, the configuration illustrated in FIG. 2 severely limits an operator's ability to access regions of the wellbore below plug 15, for example, to deliver chemical foamer to the end of the dead string.

SUMMARY OF THE INVENTION

The presently disclosed apparatus provides a dead string for reducing the critical velocity of gas produced in a perforated interval of a gas well while still providing the well operator with the ability to access the well bore below the dead string. The apparatus features a tubing string extending into the gas well and having a ported member co-axially disposed within the tubing string. Typical ported members include sliding sleeve valves or ported flow subs, which are described in more detail below. The ported member will typically be positioned at the top of or in the top third of the perforated interval. The ported member is configured to selectively permit or prevent fluid communication between the interior of the ported member and the annular region between the tubing string and a wall of the well. When the ported member is open, fluids and gasses can enter the tubing string from the annulus via ports in the ported member. Alternatively, the ports can be closed to allow fluids to be run through the ported member to sections of the tubing string below the ported member.

The apparatus includes a retrievable plug disposed within the tubing string below the ported member. Typically, when the plug is in place, fluid flow will be entering the tubing string from the annulus via the ported member and flowing toward the surface in the tubing string. However, should an operator wish to run fluids or equipment (wireline equipment, etc.) down the string below the plug, the operator simply removes the plug to access lower regions of the string because the dead string is open ended below the plug.

The apparatus also includes a dead string co-axially disposed in the tubing string below the retrievable plug. Flow between the dead string and the upper part of the tubing string is blocked by the retrievable plug. Thus, the dead string operates simply to decrease the flow area of the annulus and thereby decrease the critical velocity of gas produced in the perforated interval. However, an operator can access the dead string by removing the retrievable plug.

Embodiments of the apparatus are also configured to deliver reagents such as foamers and/or surfactants to the extended perforated interval. For example, capillary tubing can be attached to tubing string to provide a conduit for such reagents. A valve or inlet such as a gas lift mandrel or injection sub can provide a crossover of the reagents from the capillary tubing to the inside of tubing string. According to one embodiment, the retrievable plug is configured to be moved either above or below the depth where reagent is delivered into the tubing string. Further aspects and advantages of the presently disclosed apparatus will be apparent in view of the figures and description below.

DETAILED DESCRIPTION OF THE INVENTION

Figure 3:
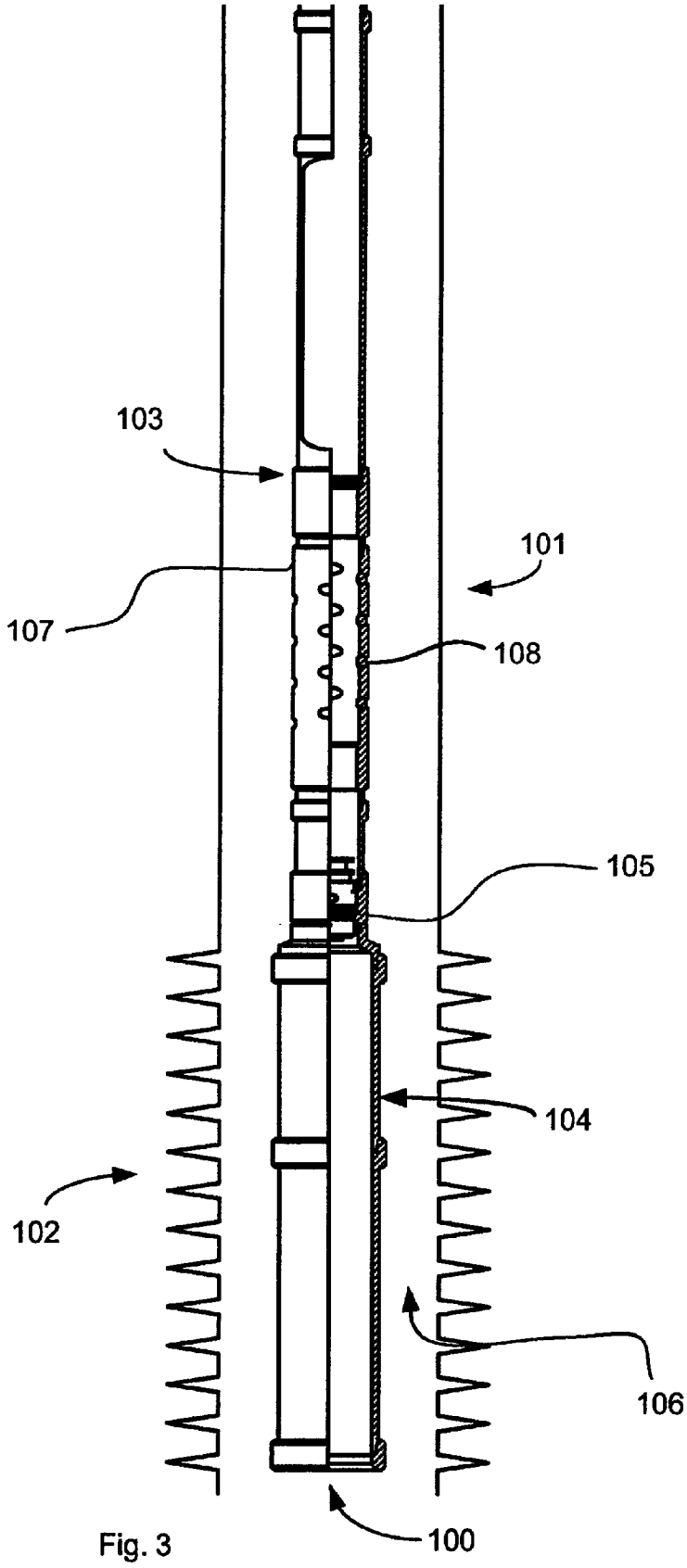
FIG. 3 illustrates a production string having a ported member, a retrievable plug, and a dead string.

FIG. 3 illustrates an embodiment of the presently disclosed apparatus. The apparatus 100 can be deployed in a cased wellbore 101 having a perforated interval 102. Apparatus 100 includes a production tubing section 103 and a dead string 104. The inner diameter (ID) of production tubing section 103 and the ID of dead string 104 are isolated from each other by retrievable plug 105. During operation, gas and formation fluids in perforated interval 102 flow in the annular region 106 around dead string 104. Dead string 104 typically has a larger outer diameter (OD) than production tubing section 103 but could be the same size as the production tubing. For example, in a well with 4½" casing having an ID of 4", the production string might have an OD of 2⅜" and the dead string might have an OD of 2⅞". Dead string 104 reduces the flow area in the perforated interval, thereby decreasing the critical velocity needed to lift produced liquids in the wellbore reducing the effects of liquid loading. It is often preferable that the couplings used for dead string 104 be configured flush with the profile of the OD of the dead string and not have external collars, etc., which cause accumulation sites for sand and particulate in the wellbore. Such "Ultra Flush Joint" pipe is known in the art. A particularly suitable joint is the ULTRA-FJ, available from Weatherford International, Inc. (Houston, Tex.). Additionally, various sizes of coil tubing are known in the art and can be used.

Fluids and gas flows upward in annular region 106 and cross over into the production tubing section 103 via ported member 107 through ports, which provide fluid communication between the inside and outside of the ported member. According to a one embodiment, ported member 107 is configured such that ports 108 can be closed, i.e., so that fluid communication between the inside and the outside of ported member 107 can be selectively permitted or prevented. Ported member 107 can be, for example, a sliding sleeve valve, as is known in the art. When the sliding sleeve valve is open, formation fluids can enter the ID production tubing via ports in the valve. Likewise, the valve can be closed, thereby isolating the valve.

Figure 4:
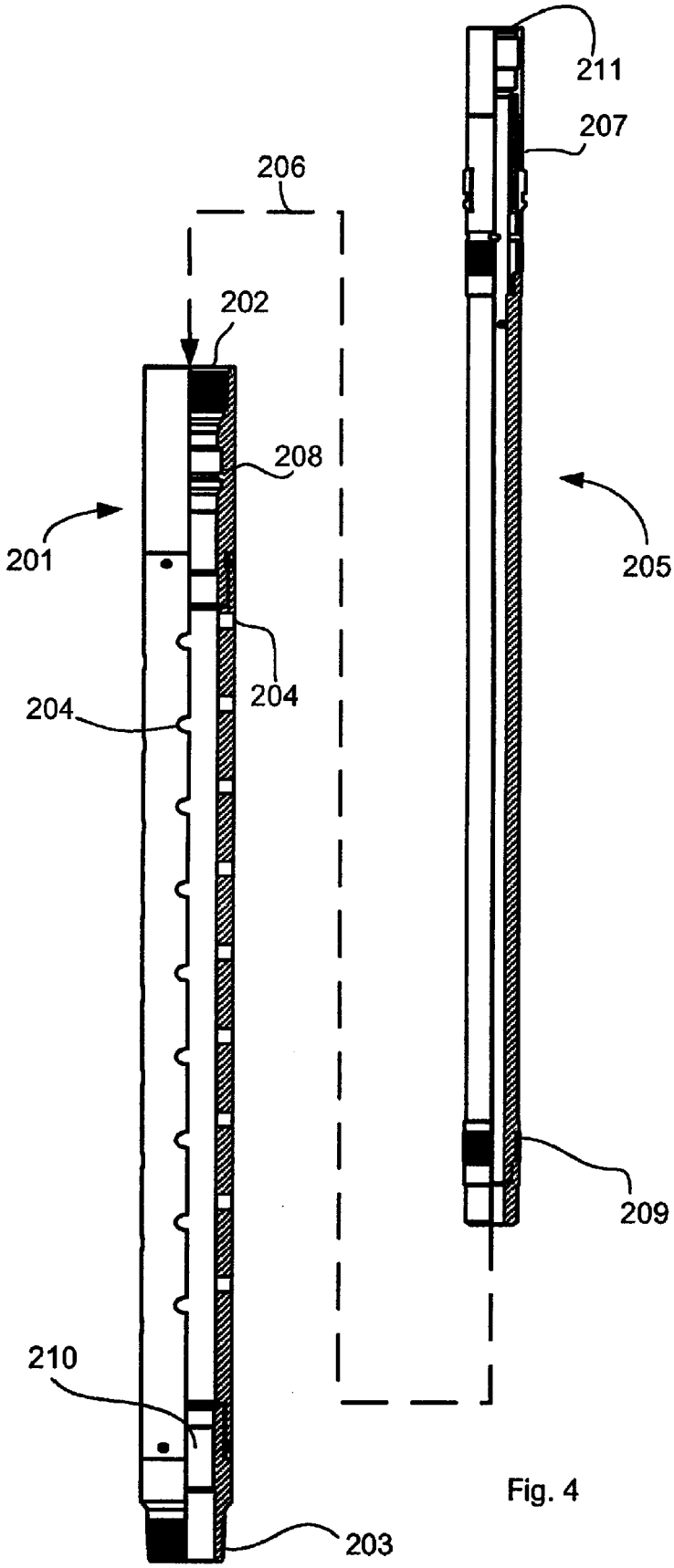
FIG. 4 illustrates a ported flow sub having configured to engage an isolation tool.

According to an alternative embodiment, a ported member 107 can be a ported flow sub instead of a sliding sleeve valve. An example of a ported flow sub is schematically illustrated in FIG. 4. Ported flow sub 201 is configured to integrate into a production stream via threaded ends 202 and 203 and its simplest embodiment is a length of tubing having ports 204 disposed therein. A ported flow sub 201 typically provides greater flow area than is available with a sliding sleeve valve. Flow sub 201 can include an isolation tool 205 for closing off ports 204. Isolation tool 205 is a tubular member that is configured to fit within the ID of flow sub 201 as depicted by dashed line 206. Isolation tool 205 can be designed to lockingly engage within flow sub 201, for example, via locking mechanism 207, which is configured to engage mating receiver 208 on flow sub 201. The isolation tool illustrated in FIG. 3 also features a seal ring packing 209 that is configured to seal within a polished bore 210 in flow sub 201. When isolation tool 205 is inserted in flow sub 201 it effectively isolates ports 204 and provides a flow path through the inner diameter 211 of the isolation tool. Thus, an operator can deliver fluids down the production tube to regions of the production tube below the ported flow sub bypassing ports 204. A particularly suitable ported member is a Heavy Duty Flow Sub (Weatherford International, Inc., Houston, Tex.), which is compatible with a locking isolation tool as described above.

The presently disclosed apparatus provides an advantage over previous dead string assemblies because plug 105 is a retrievable plug and thus can be removed to provide an operator access to the tubing string below the plug. Retrievable plugs are known in the art. A particularly suitable retrievable plug assembly is a WX Nipple with a retrievable equalizing plug (Weatherford International, Inc., Houston, Tex.).

Figure 2:
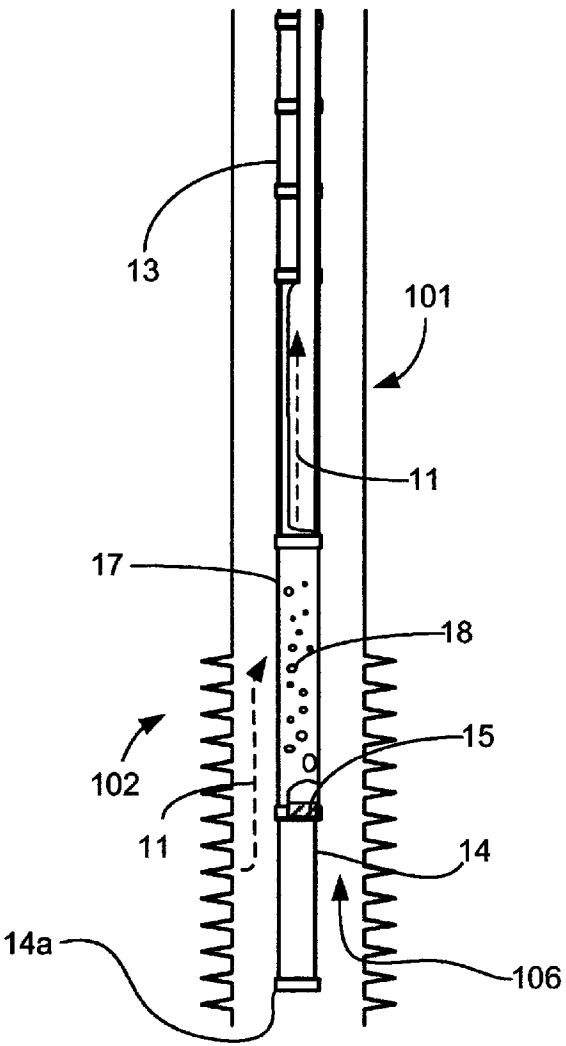
Fig. 2 (prior art)
FIG. 2 illustrates a prior art configuration of a dead string attached to a production string.

To check for sand fill in the wellbore below the apparatus illustrated in FIG. 2, an operator can remove retrievable plug 105 and run a wire line down the tubing. The wire line can exit the bottom of the dead string and continue to the bottom of the well. According to one embodiment, the end of the dead string can include a wire line re-entry guide to assist in pulling the wire line tools back up into the dead string. If sand levels are acceptable, retrievable plug 105 is simply reinstalled and the system is immediately operational.

If dead string 104 is sanded in, an operator can try. to establish circulation down the tubing and back up the annulus while pulling or jarring on the production tubing string. To do this, the operator would typically shut off ports 108, for example by installing an isolation tool as described above if ported member 107 is a ported flow sub. The operator can then deliver fluid to the bottom of the dead string while attempting to free the dead string.

According to one embodiment, the apparatus can include a safety release mechanism such as a shear-out joint, for example, between the removable plug 105 and the dead string 104. Such a mechanism provides the operator the option to shear off and pull out the tubing, ported member, and plug assembly, should the previously described correction attempts fail. The operator simply applies adequate tension to tubing string to shear the tubing string at the shear-out joint and removes the string components above the joint. The operator can then recover the component(s) below the shear-out joint (namely, dead string 104) via fishing operations known in the art.

Another method commonly used in the art for overcoming liquid loading injection of reagents, such as foamers and/or surfactants into the perforated interval to decrease the surface tension and density of the liquid column. Typically, one would run a small diameter tubing line for delivering the chemical down through the production tubing to the desired depth, for example, out the end of the production tube. However, this method is not possible with the dead string assembly illustrated in FIG. 2 because plug 15 or the bull plug on the end of the dead string essentially isolates the string and well-bore below the plug. The embodiment of the presently disclosed apparatus illustrated in FIG. 5 overcomes this limitation of the prior art. This embodiment includes capillary tubing 301 or a side string banded to the OD of the tubing string and connecting to a gas lift mandrel 302 or injection sub installed in the tubing string below removable plug 105. This embodiment provides the ability to deliver reagents, such as foamers, surfactants, etc. to the perforated interval 102 (shown in FIG. 1). The gas lift mandrel is installed below retrievable plug 105 so that such reagents can be injected into dead string 104 via inlet 303, rather than being routed back up the production tubing. The reagents will be injected into the top of dead string 104 and can then fall through the ID of the dead string and into perforated interval 102.

An alternative to banding capillary tubing or a side string to the OD of the tubing string is running the capillary tubing inside the production tubing to a modified nipple where the plug would normally be. This would allow the dead string assembly to be "snubbed" into the hole and still allow an operator the ability to get soap to the bottom of the dead string. This would limit the ability to run plunger lift, as discussed below.

Figure 5:
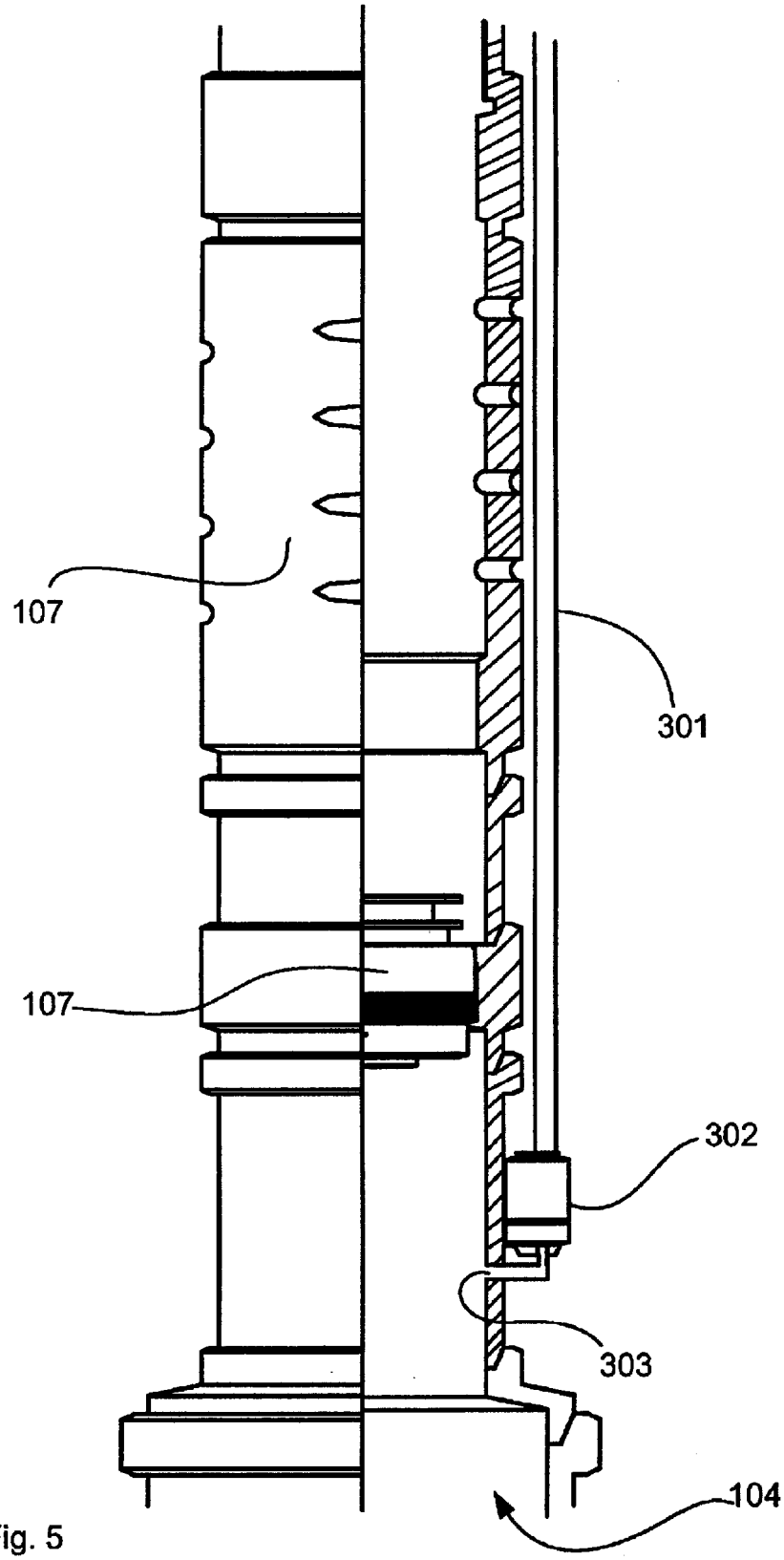
FIG. 5 illustrates a production string having a ported member, a retrievable plug, and a dead string, exteriorly banded capillary tubing, and a gas lift valve.

The apparatus can include nipples configured to receive retrievable plug 105 below inlet 303, rather than above inlet 303 as illustrated in FIG. 5 because in some situations it might be desirable to remove retrievable plug 105 and reinstall it below inlet 303. For example, if the perforated interval does not generate sufficient gas to generate foam in the annular region around dead string 104, the operator can reinstall plug 105 below inlet 303 and inject foamer into the production tubing below ported member 107. Typically, the apparatus will be installed in the wellbore so that ported member 107 is at or near the top third of the perforated interval. There will typically be enough turbulence due to gas entering the production tubing via ported member 107 to generate foam.

Figure 1:
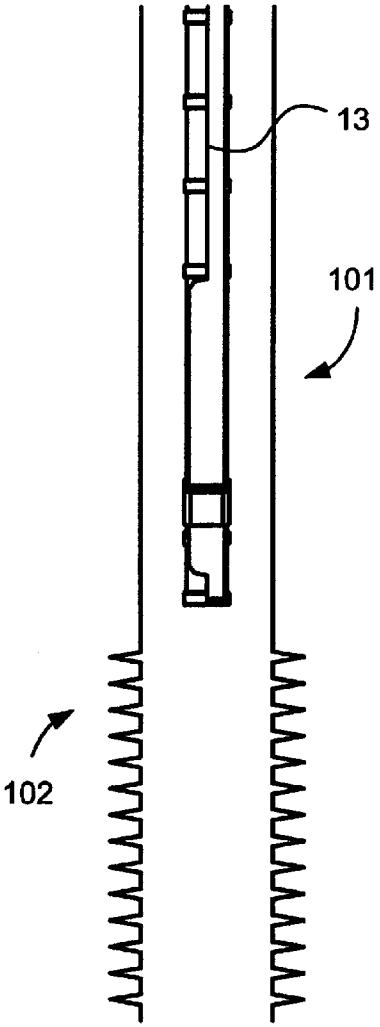
Fig. 1 (prior art)
FIG. 1 illustrates a length of production tubing string deployed in a cased natural gas wellbore having a perforated interval, as is common in the prior art.

According to an additional embodiment, a plunger lift system can be installed in the production tubing above ported member 107. Plunger lift systems are known in the art and need not be explained in detail here, other than to mention that they are typically implemented in conventional systems, such as illustrated in FIG. 1, wherein the production tubing terminates at the top of the perforated interval or in roughly the top third of a perforated interval. The effectiveness of plunger lift systems suffers if the tubing terminates too high above or too deep within the perforated interval. In the presently disclosed apparatus, a plunger lift system can be installed in the production tubing above ported member 107. In such a configuration, ported member 107 is analogous to the terminus of the production tubing in a conventional system and is typically disposed at the top of or within the top third of the perforated interval for optimum plunger lift operation.

It should be understood that the inventive concepts disclosed herein are capable of many modifications. To the extent such modifications fall within the scope of the appended claims and their equivalents, they are intended to be covered by this patent.

What is claimed is:

1. A system for recovering gas from a gas well, comprising:

a tubing string extending into the gas well;

a ported member co-axially disposed within the tubing string, the ported member configured to selectively permit or prevent fluid connection between an interior of the ported member and an annular region between the tubing string and a wall of the well;

a retrievable plug disposed within the tubing string below the ported member; and a dead string co-axially disposed in the tubing string below the retrievable plug.

2. The system of claim 1, wherein the dead string is disposed in a perforated interval of the well.

3. The system of claim 1, wherein an outer diameter of the dead string is greater than an outer diameter of the tubing string.

4. The system of claim 1, further comprising a wireline re-entry guide attached to the dead string.

5. The system of claim 1, wherein the ported member is a sliding sleeve valve.

6. The system of claim 1, wherein the ported member is a ported flow sub.

7. The system of claim 1, further comprising capillary tubing attached to an exterior wall of the tubing string for delivering reagents to a top of the dead string.

8. The system of claim 7, further comprising a valve for delivering reagents from the capillary tubing into an interior of the tubing string or dead string below the ported member.

9. The system of claim 8, wherein the retrievable plug is configured to be selectively positioned above or below the valve for delivering reagents.

10. The system of claim 1, further comprising a capillary tubing inside the tubing string for delivering reagents to a top of the dead string.

11. The system of claim 1, further comprising a plunger lift system installed in the tubing stream above the ported member.

12. A system for recovering gas from a gas well, comprising:

a tubing string extending into the gas well;

a means for selectively permitting or preventing fluid communication between an interior of the tubing string and an annular region between the tubing string and a wall of the well;

a retrievable plug disposed within the tubing string below the means for selectively permitting or preventing fluid communication between an interior of the tubing string and an annular region between the tubing string and a wall of the well; and a dead string co-axially disposed in the tubing string below the retrievable plug.

13. The system of claim 12, wherein the means for selectively permitting or preventing fluid communication between an interior of the tubing string and an annular region between the tubing string and a wall of the well is a ported flow sub or a sliding sleeve valve.

14. The system of claim 12, further comprising a means for delivering reagents to an interior of the dead string.

15. The system of claim 14, wherein the means for delivering reagents is a capillary tube or side string attached to an exterior wall of the tubing string and a valve for communicating reagents between the capillary tube and an interior of the dead string.

16. A method of reducing the critical velocity of a gas produced in a perforated interval of a gas well, comprising:

providing a tubing string extending into the well;

providing a ported member configured to selectively permit or prevent fluid connection between an interior of the ported member and an annular region between the tubing string and a wall of the well; and providing a dead string attached to the tubing string and disposed within the perforated interval such that gas produced in the perforated interval flows through an annular flow path between the dead string and a wall of the well and crosses over into an interior of the tubing string via the ported member;

wherein an interior of the dead string and the interior of the ported member are selectively isolatable from each other by a retrievable plug.

17. The method of claim 16, further comprising delivering chemical foamer to the interior of the dead string.

*18. A system for recovering fluid from a well, comprising:*

*a tubing string extending into the well;*

*a ported member co-axially disposed within the tubing string;*

*a retrievable plug disposed within the tubing string below the ported member; and*

*a dead string co-axially disposed in the tubing string below the retrievable plug.*

*19. The system of claim 18, wherein the outer diameter of the dead string is greater than an outer diameter of the tubing string.*

*20. The system of claim 18, further comprising a wireline re-entry guide attached to the dead string.*

*21. The system of claim 18, wherein the ported member is a ported flow sub.*

*22. The system of claim 18, further comprising capillary tubing attached to an exterior wall of the tubing string for delivering materials to a top of the dead string.*

*23. The system of claim 22, further comprising a valve for delivering materials from the capillary tubing into an interior of the tubing string or dead string below the ported member.*

*24. The system of claim 23, wherein the retrievable plug is configured to be selectively positioned above or below the valve for delivering materials.*

*25. The system of claim 18, further comprising a capillary tubing inside the tubing string for delivering materials to a top of the dead string.*

*26. The system of claim 18, further comprising a plunger lift system installed in the tubing stream above the ported member.*

*27. A system for recovering fluid-from a well, comprising:*

*a tubing string extending into the well;*

*a ported member co-axially disposed within the tubing string, the ported member configured to selectively permit or prevent fluid flow from an annular region between the tubing string and a wall of the well to the surface of the well through the tubing string;*

*a retrievable plug disposed within the tubing string below the ported member; and*

*a dead string co-axially disposed in the tubing string below the retrievable plug.*

*28. The system of claim 27, wherein the outer diameter of the dead string is greater than an outer diameter of the tubing string.*

*29. The system of claim 27, further comprising a wireline re-entry guide attached to the dead string.*

*30. The system of claim 27, wherein the ported member is a ported flow sub.*

*31. The system of claim 27, further comprising capillary tubing attached to an exterior wall of the tubing string for delivering materials to a top of the dead string.*

*32. The system of claim 31, further comprising a valve for delivering materials from the capillary tubing into an interior of the tubing string or dead string below the ported member.*

*33. The system of claim 32, wherein the retrievable plug is configured to be selectively positioned above or below the valve for delivering materials.*

*34. The system of claim 27, further comprising a capillary tubing inside the tubing string for delivering materials to a top of the dead string.*

*35. The system of claim 27, further comprising a plunger lift system installed in the tubing string above the ported member.*

*36. A system for recovering fluid from a well, comprising:*

*a tubing string extending into the well;*

*a ported member co-axially disposed within the tubing string, wherein in a first configuration fluid is prevented from flowing from an annular region between the ported member and a wall of the well through the tubing string to the surface of the well and in a second configuration fluid is permitted to flow from the annular region through the tubing string to the surface of the well;*

*a retrievable plug disposed within the tubing string below the ported member; and*

*a dead string co-axially disposed in the tubing string below the retrievable plug.*

*37. The system of claim 36, wherein the outer diameter of the dead string is greater than an outer diameter of the tubing string.*

*38. The system of claim 36, further comprising a wireline re-entry guide attached to the dead string.*

*39. The system of claim 36, wherein the ported member is a ported flow sub.*

*40. The system of claim 36, further comprising capillary tubing attached to an exterior wall of the tubing string for delivering materials to a top of the dead string.*

*41. The system of claim 40, further comprising a valve for delivering materials from the capillary tubing into an interior of the tubing string or dead string below the ported member.*

*42. The system of claim 41, wherein the retrievable plug is configured to be selectively positioned above or below the valve for delivering materials.*

*43. The system of claim 36, further comprising a capillary tubing inside the tubing string for delivering materials to a top of the dead string.*

*44. The system of claim 36, further comprising a plunger lift system installed in the tubing stream above the ported member.*

* * * * *